Jan. 20, 1925.  
J. C. GREGORY  
VEHICLE LIFTER  
Filed June 19, 1924  
1,523,955  
3 Sheets-Sheet 1

Inventor  
J. C. Gregory  
by Hazard and Miller  
Attys

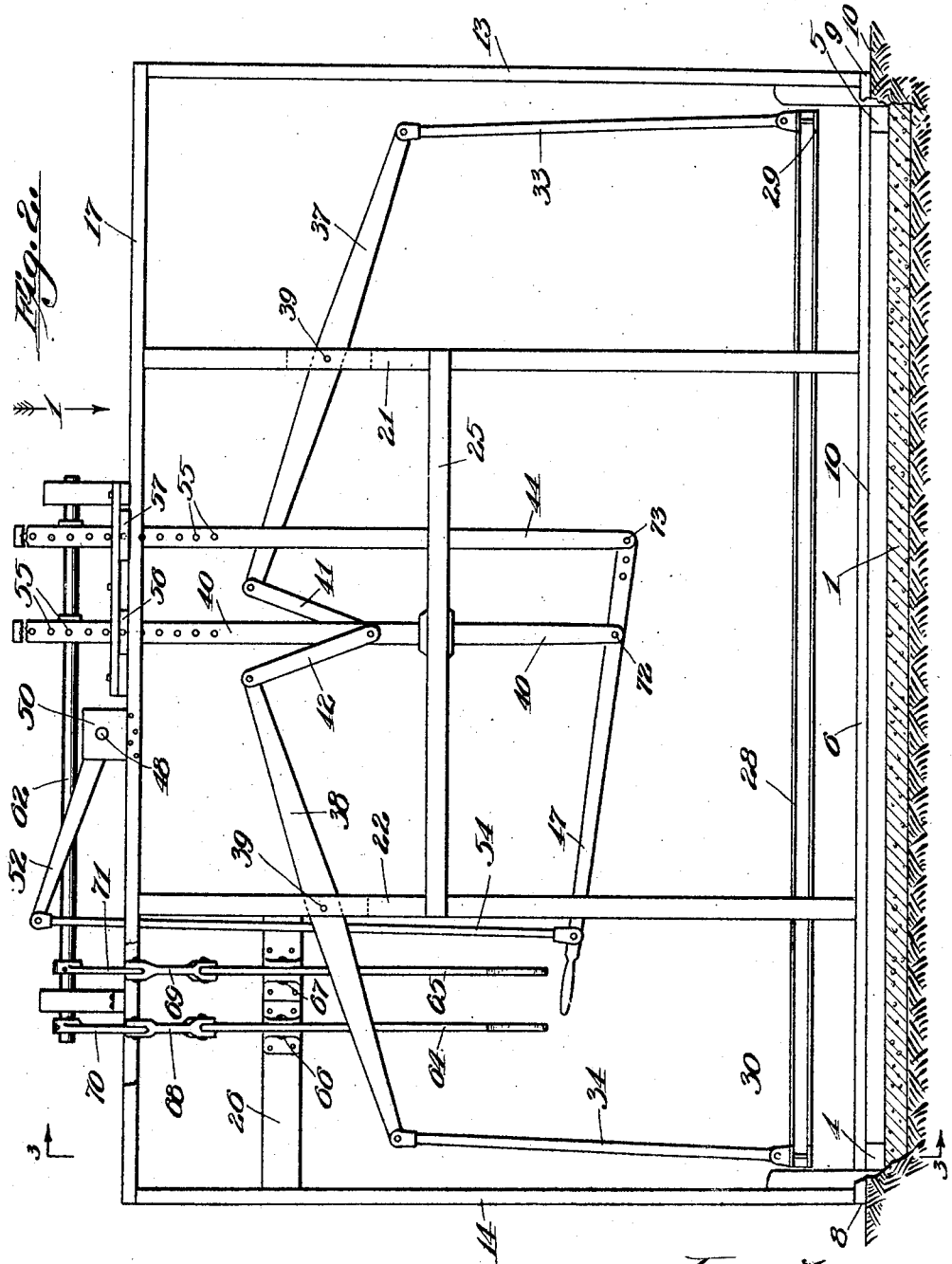

Jan. 20, 1925.
J. C. GREGORY
VEHICLE LIFTER
Filed June 19, 1924    3 Sheets-Sheet 3
1,523,955
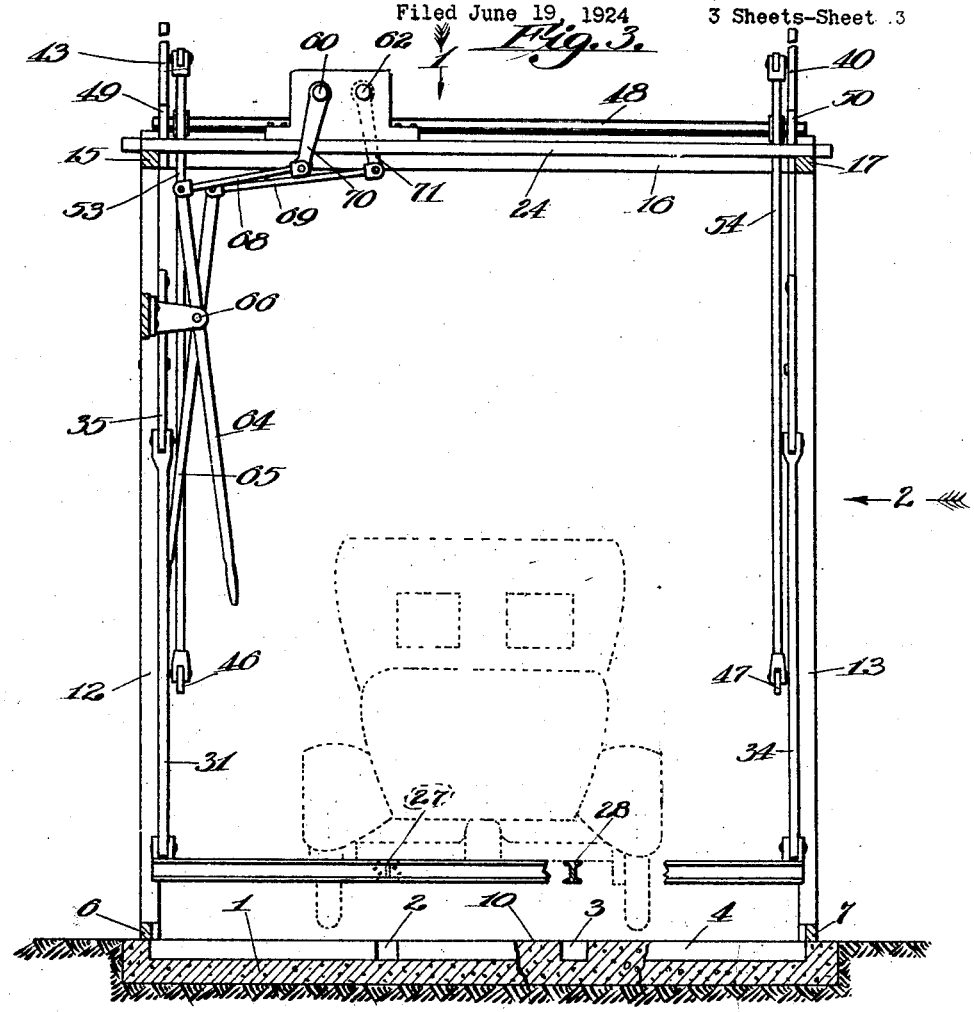
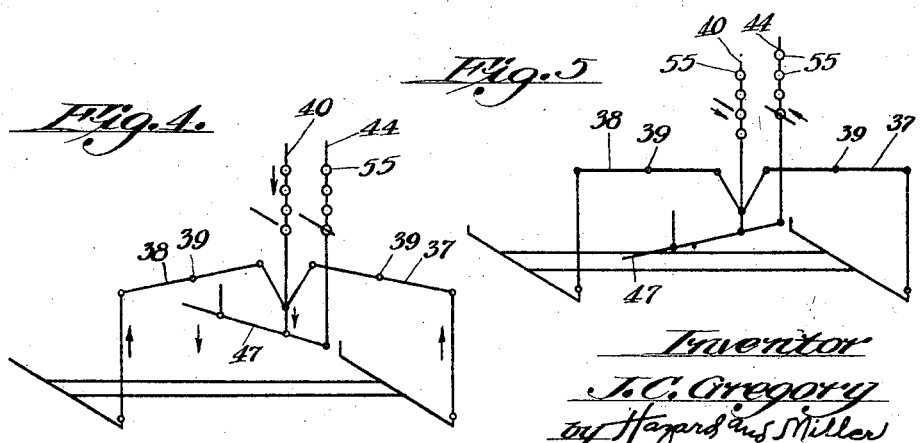
Inventor
J. C. Gregory
by Hazard and Miller
Attys Patented Jan. 20, 1925.

1,523,955

UNITED STATES PATENT OFFICE.

JOHN C. GREGORY, OF LOS ANGELES, CALIFORNIA.

VEHICLE LIFTER.

Application filed June 19, 1924. Serial No. 720,944.

*To all whom it may concern:*

Be it known that I, JOHN C. GREGORY, a citizen of the United States, residing at Los Angeles, in the county of Los Angeles and State of California, have invented new and useful Improvements in Vehicle Lifters, of which the following is a specification.

This invention is a vehicle lifter and consists of the novel features herein shown, described and claimed.

An object is to make a device to be installed in a garage or other suitable position and adapted to lift a motor vehicle to take the load off from the tires when the vehicle is to stand idle for some time, and obviously the tires, rims and wheels may be removed and changed while the vehicle is lifted.

Other objects and advantages will appear from the drawings and specification.

The drawings illustrate the construction and operation of a vehicle lifter embodying the principles of the invention.

Fig. 2 is a side elevation as indicated by the arrows 2 in Figs. 1 and 3.

Fig. 3 is a vertical cross section on the line 3—3 of Figs. 1 and 2 and looking in the direction indicated by the arrows.

Figs. 4 and 5 are diagrammatic views illustrating the operation.

Figure 1:
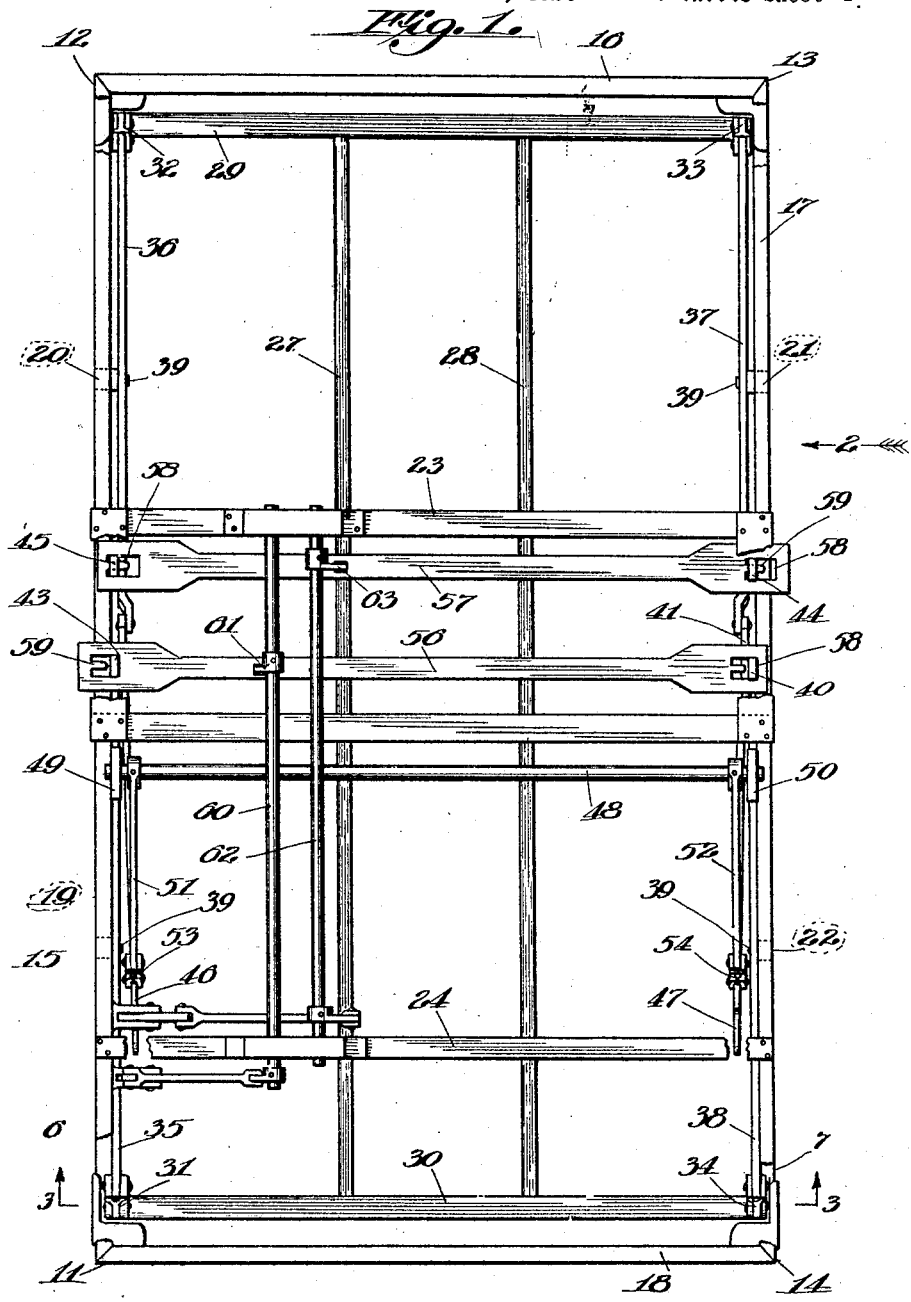
Figure 1 is a top plan view of the vehicle lifter as indicated by the arrows 1 in Figs. 2 and 3.

The details of construction and operation shown in the drawings are as follows:

The concrete foundation 1 has longitudinally extending recesses 2 and 3 and transverse recesses 4 and 5 in its upper face. Side sills 6 and 7 extend longitudinally and are connected at their ends by cross sills 8 and 9, and the sills rest upon the surface 10 of the floor. Posts 11, 12, 13 and 14 extend upwardly from the corners formed by the sills 6, 7, 8 and 9. Cap plates 15, 16, 17 and 18 are mounted upon the upper ends of the posts 11, 12, 13 and 14. Intermediate side braces 19, 20, 21 and 22 are inserted between the sills 6 and 7 and the cap plates 15 and 17 respectively, and top cross braces 23 and 24 connect the cap plates 15 and 17. A horizontal brace 25 is inserted between the posts 21 and 22, and a similar brace is inserted between the posts 19 and 20. A bearing brace 26 is inserted between the posts 11 and 19.

The lifting beams 27 and 28 are adapted to fit in the longitudinal recesses 2 and 3 and are rigidly connected by the heads 29 and 30, said heads being adapted to fit in the recesses 4 and 5. Links 31, 32, 33 and 34 are connected to the outer ends of the heads 30 and 29 and extend upwardly. Levers 35, 36, 37 and 38 are connected to the upper ends of the links 31, 32, 33 and 34 respectively and are pivotally connected at their centers to the posts 19, 20, 21 and 22 respectively by pivots 39. The inner ends of the levers 37 and 38 are connected to a plunger 40 by links 41 and 42 and the inner ends of the levers 35 and 36 are connected to a plunger 43 in the same way. A third plunger 44 is mounted parallel with the plunger 40, and a fourth plunger 45 is mounted parallel with the plunger 43. A hand lever 46 connects the lower ends of the plungers 43 and 45 and a similar hand lever 47 connects the lower ends of the plungers 40 and 44.

A shaft 48 is mounted transversely in bearings 49 and 50. Crank arms 51 and 52 are fixed upon the shaft 48 and connected to the levers 46 and 47 by links 53 and 54 so as to connect the hand levers 46 and 47 together, so that when either lever is operated the other is operated.

The plungers 43 and 45 and 40 and 44 on the other side are each provided with a series of perforations 55. Bars 56 and 57 are slidingly mounted transversely upon the caps 15 and 17 and the plungers 43, 45, 40 and 44 slide through openings 58 in the ends of the bars. Tongues 59 extend into the openings 58 and are adapted to enter the perforations 55. A rock shaft 60 is mounted above the bar 56 and has a crank arm 61 extending through an opening in the bar 56 so that as the shaft 60 is rocked the bar 56 is reciprocated to the extent of the openings 58 and as required to insert the tongues 59 into and out of the perforations 55.

In a like manner, a rock shaft 62 is mounted above the bar 57 and has a crank arm 63 extending through an opening in the bar 57 so that as the shaft 62 is rocked the bar 57 is reciprocated to move the tongues 59 into and out of the perforations 55 in the plungers 44 and 45. Hand levers 64 and 65 are mounted upon pivots 66 and 67 supported in bearings upon the bar 26. Links 68 and 69 connect the upper ends of the levers 64 and 65 to crank arms 70 and 71 connected to the rock shafts 60 and 62, so that as the hand levers 64 and 65 are operated the shafts 60 and 62 are rocked. The pivots 72 and 73 connecting the hand levers 46 and 47 to the lower ends of the plungers 40 and 44 and 43 and 45 serve as the fulcrums for the levers 46 and 47, said fulcrums working alternately as the hand levers 46 and 47 are worked up and down.

When the lifting frame comprising the beams 27 and 28 and cross heads 29 and 30 is down in the recesses 2, 3, 4 and 5, the motor vehicle may be driven onto the floor 10 straddle of the beams 27 and 28, and when it is desired to lift the vehicle the hand levers 46 and 47 may both be operated or either one may be operated to depress the inner ends of the levers 35, 36. 37 and 38 and raise the lifting frame until the beams 27 and 28 engage under the axles of the vehicle, and continued operation will raise the tires of the vehicle above the floor surface 10 so that the vehicle may stand without resting upon the tires, and so that the tires, rims and wheels may be removed or otherwise manipulated.

Referring to Fig. 2, the operation of lifting is as follows:

If the hand levers 46 and 47 are raised while the tongues 59 are out of the perforations 55 in the plungers 45 and 44, the plungers will be lowered. Then if the hand lever 65 is operated to move the tongues 59 into the perforations, the plungers 45 and 44 will be held and the pivots 73 will become the fulcrums for the hand levers 46 and 47. Then if the hand levers 46 and 47 are depressed with the tongues 59 out of the perforations 55 of the plungers 43 and 40, the plungers 43 and 40 will be moved downwardly, thus pulling downwardly on the links 41 and 42 and on the inner ends of the levers 35, 36, 37 and 38, thereby raising the lifting frame one step. Then if the hand lever 65 is moved in the opposite direction to move the tongues 59 into perforations 55 in the plungers 43 and 40, these plungers will be held and the pivot 72 become the fulcrums, and the hand lever 64 will be operated to move the tongues 59 and release the plungers 45 and 44, and the hand levers 46 and 47 will be raised, thereby lowering the plungers 45 and 44. Then the hand lever 64 will be operated to move the tongues 59 into the plungers and hold the plungers 45 and 44 and the hand lever 65 will be operated to release the plungers 43 and 40, the hand levers 46 and 47 will be depressed thereby raising the lifting frame another step, and this operation will be continued until the vehicle has been raised to the desired extent.

Thus I have produced a vehicle lifter comprising a lifting frame over which a vehicle may be driven and an overhead jack mechanism for elevating and lowering the lifting frame and at the same time maintaining the horizontal level of the lifting frame and vehicle.

Various changes may be made without departing from the spirit of the invention as claimed.

I claim:

1. A vehicle lifter comprising parallel lifting beams, heads connecting the ends of the beams and extending beyond the beams, and hand lever lifting mechanism connected to the ends of the beams and adapted to raise and lower the beams step by step and maintain the horizontal level.

2. In a vehicle lifter, plungers vertically mounted and adapted to be raised or lowered step by step, hand levers connected to pairs of the plungers, and means whereby the operation of the hand levers will raise or lower a vehicle and maintain the level of the vehicle.

3. A vehicle lifter comprising a supporting frame, a lifting frame adapted to be lifted within said supporting frame, levers pivoted to said supporting frame, links connecting one end of each lever to said lifting frame, plungers to which the remaining ends of the levers are connected, hand levers pivoted to said plungers, fulcrum plungers to which said hand levers are pivoted, and means for temporarily securing either the first mentioned plungers or the fulcrum plungers, or both, to the supporting frame.

4. A vehicle lifter comprising a supporting frame, a lifting frame adapted to be lifted within said supporting frame, levers pivoted to said supporting frame, links connecting one end of each lever to said lifting frame, plungers to which the remaining ends of the levers are connected, hand levers pivoted to said plungers, fulcrum plungers to which said hand levers are pivoted, means for temporarily securing either the first mentioned plungers or the fulcrum plungers, or both, to the supporting frame, and means for causing said hand levers to be simultaneously operated.

5. A vehicle lifter comprising a supporting frame, a lifting frame adapted to be lifted within said supporting frame, levers pivoted to said supporting frame, links connecting said lifting frame to one end of each lever, a plunger connected to each lever, a hand lever pivoted to said plunger, means forming a fulcrum for said hand lever, and means for adjusting the fulcrum forming means with respect to said supporting frame.

6. A vehicle lifter comprising a supporting frame, a lifting frame adapted to be lifted within said supporting frame, a pair of levers pivoted upon each side of said supporting frame, means connecting one end of each lever to said lifting frame, a plunger upon each side of the supporting frame, means connecting each pair of levers to their respective plungers, levers pivoted upon said plungers, fulcrum plungers to which the last mentioned levers are pivoted, means for causing the last mentioned levers to be operated simultaneously, means for simultaneously and temporarily securing said plungers to said supporting frame, and means for simultaneously causing said fulcrum plungers to be temporarily secured to said supporting frame.

In testimony whereof I have signed my name to this specification.

JOHN C. GREGORY.